United States Patent [19]
Elmer

[11] 3,880,265
[45] Apr. 29, 1975

[54] FAN DRIVES

[75] Inventor: Arthur Ernest Henry Elmer, Painswick, England

[73] Assignee: Dynair Limited, Gloucestershire, England

[22] Filed: June 25, 1973

[21] Appl. No.: 373,318

Related U.S. Application Data

[62] Division of Ser. No. 200,454, Nov. 19, 1971, Pat. No. 3,757,914.

[52] U.S. Cl.............................. 192/58 B; 192/82 T
[51] Int. Cl............................................ F16d 35/00
[58] Field of Search................ 192/58 B, 58 C, 82 T

[56] References Cited
UNITED STATES PATENTS

| | | | |
|---|---|---|---|
| 2,988,188 | 6/1961 | Tauschek | 192/82 T |
| 3,339,689 | 9/1967 | Sutaruk | 192/58 B |
| 3,458,020 | 7/1969 | Lutz | 192/58 B |
| 3,498,431 | 3/1970 | Sutaruk | 192/58 C X |
| 3,568,647 | 3/1971 | Adams | 192/58 B X |
| R24,157 | 5/1956 | Johnson | 192/82 T |

*Primary Examiner*—Allan D. Herrmann
*Attorney, Agent, or Firm*—Young & Thompson

[57] ABSTRACT

A rotary fan including a fluid filled slipping clutch and means for dis-engaging the slipping clutch by means of a remote thermal sensing device in a liquid coolant circuit, the sensing device being arranged to actuate a pneumatic ram in the fab hub which controls a device for evacuating fluid from the slipping clutch to disconnect the drive.

2 Claims, 4 Drawing Figures

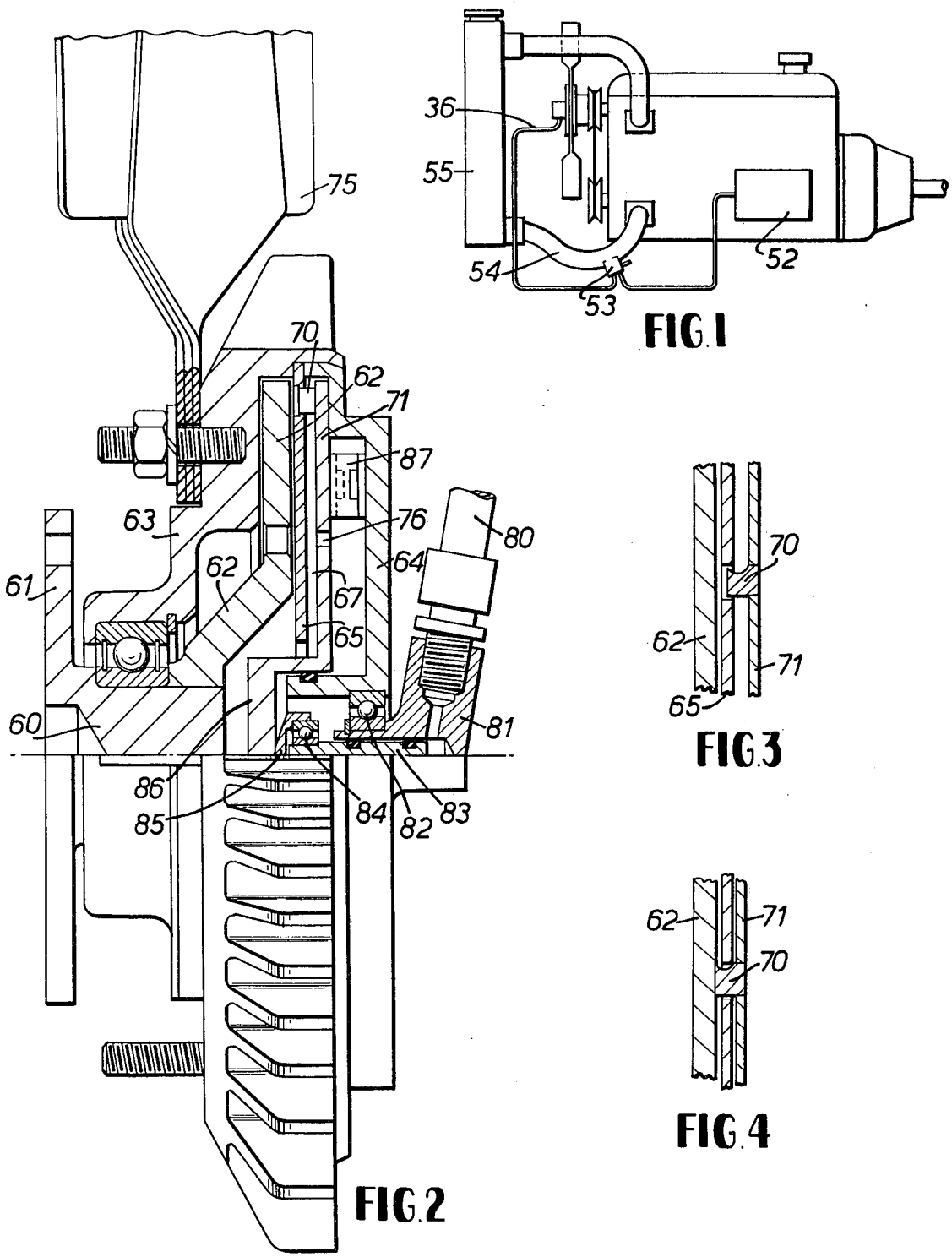

FAN DRIVES

This is a division, of application Ser. No. 200,454, filed Nov. 19, 1971, now U.S. Pat. No. 3,757,914.

This invention relates to rotary drive units or assemblies for connecting a rotary input member to an output member such as a cooling fan. The invention may be applied to rotary shaft drives but is particularly applicable to an actual cooling fan drive assembly as used for example on a motor vehicle or other internal combustion engine.

It is well known that the cooling requirements of any engine on a motor vehicle vary very considerably, and depend amongst other things on the load, gradient, and speed of the vehicle, and the ambient temperature and wind velocity. Considerable power will frequently be wasted in driving the cooling fan at excessive speed, or when the fan is not required at all, for example when the relative wind speed creates adequate ram effect for cooling purposes. A fan driven at high speed also creates considerable noise and also tends to cause wear in fan belts or other drive systems and associated parts such as water pumps.

Many previous attempts have been made to provide some control of the drive to a fan but most existing systems are expensive or somewhat ineffective for one reason or another. It is an object of the present invention in particular to provide a fan drive which will allow the fan to be driven when required at a speed somewhat slower than that of the input drive member, but without incurring the difficulties expected from a normal type of slipping clutch.

The invention consists in a cooling fan drive assembly comprising a hub for the fan and a viscous slipping clutch connected to drive the hub from a rotary drive member, a reservoir for fluid, adjustment means controlling or influencing the displacement of fluid between the reservoir and the slipping clutch to vary the torsional drive, and remote control means for actuating the adjustment means, for example in response to temperature changes at a position displaced from the fan.

The viscous slipping clutch allows the speed of the fan to vary below that of the rotary drive member at higher engine speeds and by appropriate design the maximum fan speed can be predetermined and set at a value which prevents excessive noise and wear.

In such a system the remote control means preferably comprises a pneumatic ram forming part of the fan drive assembly, and means for connection to a non-rotating pneumatic control line.

An assembly according to the invention has many useful features and advantages. By controlling the quantity of fluid effectively present in the slipping clutch the drive can be varied and by effectively evacuating the clutch the drive can be disconnected when the sensed temperature so indicates, the temperature sensing being performed by and through the remote control system from a sensing point located for example in the water cooling circuit. This assembly may also include a resilient torsional vibration damper acting between the fan itself and the rotary drive member to provide or minimise transmission of high frequency vibrations to the fan. The torsional vibrations from the crankshaft or other drive member are effectively damped by the resilient damping device, and the thermal control includes a remote thermal sensor which can be associated with the water cooling system or other coolant for the engine thus avoiding many of the difficulties experienced in any system having an air sensing thermal device such as a bi-metallic strip exposed directly to the air passing over the engine. Such elements tend to become extremely dirty, inherently have a tendency for thermal drift, and some sluggishness in response, and moreover any temperature sensing from cooling air is less reliable than a liquid coolant thermal sensing system since it is affected considerably by ambient temperature variations.

The invention may be performed in various ways and one specific embodiment will now be described by way of example with reference to the accompanying drawings, in which:

FIG. 1 is a diagram illustrating the main components of a remote coolant temperature sensing control system, FIG. 2 is a somewhat diagrammatic part-sectional elevation through an embodiment of a fan drive assembly according to the invention, and FIGS. 3 and 4 are detailed sectional developed views illustrating the two operative positions of the fluid scoops incorporated in the embodiment of FIG. 2.

In the example of the invention illustrated in FIGS. 2, 3 and 4 the unit has a coolant temperature sensing control system for varying the effective quantity of liquid in the viscous slipping clutch. As shown in FIG. 2 the unit comprises a main input drive member 60 having a flange 61 formed with holes to receive bolts for connection to a crankshaft or cam shaft of the engine, the drive member 60 being connected to an internal rotary element in the form of an annular drive disc 62 forming the input element of a viscous fluid clutch. The disc is surrounded by a housing comprising a back casting 63 a front plate 64 and an intermediate partition plate 65. The casting 63 and the partition plate 65 are formed to give a small clearance on both faces of the disc 62 and the space between the plates 64 and 65 acts as an internal compartment 67 which provides a fluid reservoir.

The partition plate 65 has a number of small apertures around its periphery, and in each of these is mounted an axially movable scoop 70, the scoops being mounted on adjustment means in the form of a control plate 71. When the plate 71 is in the right hand position illustrated in FIG. 4 the scoops are withdrawn into the apertures in the partition plate, and are ineffective: fluid then occupies the clearance spaces on both sides of the drive disc 62, and torque is transmitted to the output part of the clutch including the back casting 63 on which the fan blades 75 are mounted. When the plate 71 is in its left hand position illustrated in FIG. 5 the scoops are extended through the apertures in the partition plate into close proximity with the drive disc 62, and the relative rotation between tie disc and the scoops causes fluid to be impelled radially inwards into the reservoir compartment 67, passing through apertures 76 in the control plate to occupy the volumes on both sides of this plate 71. The quantity of fluid in the small clearance volumes on opposite sides of the drive disc 62 is thus reduced, so reducing the torque capacity of the unit.

The movements of the control plate 71, which govern the operation of this viscous drive clutch, are controlled by a remotely situated thermal sensing device as represented by the thermal sensing valve 53 of FIG. 1, arranged to admit compressed air via a flexible pressure line 80 connected to a non-rotary ram cylinder member 81 positioned within a central recess in the front plate 64, and axially fixed relative thereto by a thrust bearing 82. The ram comprises two main operative parts, namely the ram cylinder 81 and a plunger piston 83. The movable plunger piston 83 within the ram cylinder has a pair of O-ring seals engaging the cylinder wall, and the left hand end of this plunger is connected through a thrust bearing 84 to a cap 85 which constitutes an actuating member and bears on the central part 86 of the control plate. A series of tangential springs 87 are positioned around the periphery of the control plate, and attached to this plate and to the front plate 64, the springs acting to draw the plate 71 towards the front plate 64, i.e., in a direction to withdraw the scoops 70 so that the operative clearance spaces of the clutch are allowed to fill with fluid.

As illustrated diagrammatically in FIG. 1 the pneumatic supply line 80 is a stationary non-rotating flexible tube which is connected to a supply of compressed air (or vacuum) 52 on the vehicle, via the valve 53 mounted on and controlled by a wax capsule temperature sensing element fitted into the water cooling circuit of the vehicle, preferably at the lower hose connection 54 to the radiator 55. One form of valve unit designed for this purpose is illustrated in U.S. Pat. No. 3,446,430.

In operation, when the temperature of the engine coolant is below the predetermined value the thermal sensing valve is arranged to connect the pressure line 80 to relief. The springs 87 act to move the plate 71 to the right, the scoops 70 are withdrawn, fluid occupies the clearance spaces on both sides of the drive disc 62, and the viscous drive unit is allowed to operate in the normal manner, providing a torsional drive with increased slip as the speed and torsional resistance of the fan blades increase. When the temperature of the engine coolant reaches the preselected value the thermal sensing valve connects the pressure line 80 to a source of compressed air (as in FIG. 1) which enters the right hand end of the ram cylinder and forces the plunger piston 83 to the left, thus shifting the control plate 71 in the same direction, and so causing the scoops to extend into close proximity with the drive disc 62. As explained this results in fluid being withdrawn from the clearance spaces into the reservoir compartment 67 so that the viscous clutch is rendered partially or wholly inoperative, and the drive to the fan is interrupted. When the coolant temperature falls the process is reversed, the scoops are withdrawn by the springs 87, and the viscous drive is again rendered operative.

To prevent or reduce transmission of torsional vibrations a rubber damping unit (not shown) may be incorporated in the drive and conveniently positioned between the housing and the fan blade ring.

A number of advantages are obtained by the arrangement described. The maximum power absorption, speed, and noise of the fan are limited by the slipping viscous clutch. The slipping clutch drive is however over-ridden by the pneumatic thermal control 53 sensitive to the coolant temperature rather than the air temperature. The slipping clutch is thus effectively disconnected when the coolant temperature is above a predetermined value. The torsional vibrations from the input drive member 61 are absorbed by the resilient rubber damper and are not transferred to the fan blades so that the unit can, if required, be mounted direct on the crankshaft, and this is achieved without subjecting the rubber mounting to the heat of the viscous clutch. If the pneumatic control system should fail the friction clutch will reengage thus providing a continuous drive through the viscous clutch. Also the thermal drift and thermal delay experienced in any direct air sensing unit are almost entirely eliminated.

I claim:

1. A cooling fan assembly including a rotary input drive member located at one axial end of the assembly and formed with means for attachment to a drive shaft, a viscous fluid clutch comprising two rotary elements, namely a rotary casing supported by a bearing from said input drive member and carrying a plurality of fan blades, and an internal rotary element secured to said input drive member and spaced by a small fixed clearance from the walls of said casing, wall means defining a reservoir within said casing and communicating with said clearance, means for circulating a viscous fluid between said clearance and said reservoir including a fluid scoop carried by one of the rotary elements of said fluid clutch, said scoop being movable axially to control the rate of said circulating fluid flow, adjustment means within said casing and operatively connected to said scoop for varying the rate of said circulating fluid flow and thereby the quantity of fluid within said clearance and the torsional drive through said clutch to said fan blades, a fluid operated ram located at the end of said assembly remote from said rotary input drive member, the two operative parts of said ram being connected respectively through bearings with said adjustment means and said casing, an actuating member mounted within said casing and connected to said adjustment means and to said scoop and to an operative part of said ram, a remotely positioned non-rotating thermal sensing valve element, and a non-rotating fluid connection between said thermal sensing valve element and said ram, said fluid connection being located externally of said casing.

2. A cooling fan assembly according to claim 1, wherein said scoop is mounted for rotation with said casing, is juxtaposition with said internal rotary element.

* * * * *